United States Patent
Rivers et al.

(10) Patent No.: US 7,461,827 B2
(45) Date of Patent: Dec. 9, 2008

(54) SERVING TERMINAL ILLUMINATOR

(75) Inventors: Paul Brent Rivers, Cullman, AL (US); Frederick Diggle, III, Birmingham, AL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 123 days.

(21) Appl. No.: 11/636,186

(22) Filed: Dec. 8, 2006

(65) Prior Publication Data

US 2007/0080276 A1     Apr. 12, 2007

Related U.S. Application Data

(63) Continuation of application No. 10/768,406, filed on Jan. 30, 2004, now Pat. No. 7,147,194.

(51) Int. Cl.
*A47H 1/10* (2006.01)
*F21L 4/00* (2006.01)

(52) U.S. Cl. .............. 248/317; 248/322; 248/201; 248/304; 248/58; 248/202.1; 362/190; 362/191; 43/17.5

(58) Field of Classification Search ........... 248/49, 248/53, 58, 59, 63, 48.1, 62, 340, 317, 322, 248/327, 339, 201, 202.1, 304, 215; 362/190, 362/191, 403, 404, 269; 43/17.5
See application file for complete search history.

(56) References Cited

U.S. PATENT DOCUMENTS

| | | | | |
|---|---|---|---|---|
| 1,561,603 A | * | 11/1925 | Glade, Jr | 248/231.51 |
| 2,010,058 A | * | 8/1935 | Carlson | 362/396 |
| 2,300,915 A | * | 11/1942 | Florence | 248/168 |
| 2,402,877 A | | 6/1946 | Dial | |
| 2,433,314 A | * | 12/1947 | White | 248/231.51 |
| 2,524,173 A | * | 10/1950 | Peterson | 248/229.15 |
| 2,727,137 A | * | 12/1955 | Oharenko | 362/306 |
| 2,889,128 A | * | 6/1959 | Martin et al. | 248/324 |
| 3,591,115 A | * | 7/1971 | Hibbard | 248/123.11 |
| 3,612,853 A | | 10/1971 | Sakaki | |
| 3,872,428 A | * | 3/1975 | Boisvert | 362/396 |
| 4,506,317 A | * | 3/1985 | Duddy | 362/396 |
| 4,628,777 A | * | 12/1986 | Guarr | 81/488 |
| 4,895,329 A | * | 1/1990 | Sloan | 248/229.16 |
| 4,907,796 A | | 3/1990 | Hunley et al. | |
| 4,938,440 A | | 7/1990 | Weinfield | |
| 4,958,792 A | | 9/1990 | Rinderer | |
| 5,103,384 A | | 4/1992 | Drohan | |
| 5,163,752 A | | 11/1992 | Copeland et al. | |
| 5,276,596 A | | 1/1994 | Krenzel | |
| 5,327,847 A | | 7/1994 | Cook | |
| 5,460,346 A | | 10/1995 | Hirsch | |

(Continued)

*Primary Examiner*—Kimberly T Wood
(74) *Attorney, Agent, or Firm*—Scott P. Zimmerman, PLLC

(57) ABSTRACT

Exemplary embodiments of a hanging tool support assembly provide a portable, adjustable support to hold and/or position a tool, such as a flashlight. For example, the hanging tool support assembly hangs or is otherwise suspended from a support line proximate to a work area. According to exemplary embodiments, the hanging tool support assembly includes a pair of inverted, J-shaped hangers, a downwardly extending arm, a movable support piece connecting the downwardly extending arm to a tool support base, the tool support base, and attachment means for supporting and/or holding a tool to the tool support base. In some embodiments, the hangers may further include additional safety and/or positioning components.

16 Claims, 8 Drawing Sheets

U.S. PATENT DOCUMENTS

| | | |
|---|---|---|
| 5,573,329 A | 11/1996 | van Gennep |
| 5,577,697 A * | 11/1996 | Accordino ............... 248/206.5 |
| 5,664,875 A | 9/1997 | Hegedus |
| 5,823,658 A | 10/1998 | Doddy |
| 6,540,184 B2 | 4/2003 | Thaxton |
| 6,644,827 B2 | 11/2003 | Birdwell |
| 2002/0113185 A1 | 8/2002 | Zieglar |

* cited by examiner

SERVING TERMINAL ILLUMINATOR

CROSS REFERENCES

This application is a continuation of commonly assigned U.S. patent application Ser. No. 10/768,406 entitled "Serving Terminal Illuminator" filed on Jan. 30, 2004, now U.S. Pat. No. 7,147,194 and of which is incorporated herein by this reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

The exemplary embodiments generally relate to hardware and equipment, and, more particularly, to a tool support assembly that hangs from a line, such as a cable, conduit, and/or pipe, and that positions a tool in a desired location on the tool support assembly.

Oftentimes, an individual, such as a technician in the telecommunications, electrical, and/or plumbing industry, needs supplemental lighting to perform a repair, installation, and/or other work related activity. For example, telecommunications technicians tend to work after daylight hours aloft telephone poles for extended time periods sometimes provisioning and/or using stranded serving terminals. These terminals are typically mounted at an elevated position (e.g., stranded from a wire, cable, and/or conduit of the telephone pole or mounted to an elevated site on a building or other structure) for distributing communication signals from one or more routing cables to customers via drop wires. Oftentimes, these terminals are often poorly illuminated, a dark color, and lack an outlet for power.

To provide additional lighting, the telecommunications technician working on the terminal may have to use one hand or both to support himself/herself atop the pole and position a light source, such as a flashlight, on a work area and use the other hand to work on the terminal. This scenario tends to be dangerous and may often take the technician longer to complete work. Sometimes the technician needs to use both hands to perform the work, but also needs the additional light source. In these cases, the technician may creatively try to position the light source, such as by holding a butt end of a flashlight in his/her mouth or by taping the flashlight to the terminal and/or to the cable or by positioning the flashlight in between his/her legs and squeezing them together. Additionally, when the technician can not use both hands to perform the work, such as when the technician must use one hand to carry, support, and/or aim the flashlight, then the technician only has the other free hand to perform the work, and, consequently, the efficiency and quality of the work may be less.

Conventional approaches have failed to solve these aforementioned problems. For example, one approach to provide a portable, positionable light source is to use a light bulb and socket in a protective cage with a long extension cord. However, a power supply, such as AC power, is not always available. Other approaches for providing a portable lighting source require a level, flat surface area to either "clamp", "clip", and/or "screw" the light support to the surface. Still, another approach has been to provide a portable light source that magnetically attaches to a surface. However, many areas proximate to a work site, such as the telecommunications pole and the terminal are not equipped with an appropriate surface to secure these light sources.

In addition to the above mentioned shortcomings, many portable light sources are inadequate for technicians working with electricity at a suspended work site. For example, conventional portable light sources tend to be made of a conductive or partially conductive material that presents an electrical risk to the technician and/or to the work site (e.g., creating a short circuit). Another shortcoming is that conventional portable light sources tend to be large and/or bulky and, thus, create a potential hazard when the technician transports the device.

SUMMARY

The aforementioned problems, and other problems, are reduced, according to exemplary embodiments by providing a portable, adjustable hanging tool support that may be used to suspend, support, and/or position a tool, such as a flashlight, from a support line, such as a cable, conduit, and/or pipe. The hanging tool support assembly includes movable joints that enable the hanging tool support assembly to vertically and horizontally position the tool, such as to focus a flashlight on a desired work area. The hanging tool support assembly may be made of a variety of materials, such as, for example, paper, cloth, metal, polymer, plastic, ceramic, glass, and/or crystal.

According to exemplary embodiments, a hanging tool support assembly includes a pair of inverted, J-shaped hangers, a movable support, a tool support base, a rotational joint, and a pivoting joint. Each inverted, J-shaped hanger includes a free end and a downwardly extending end that is substantially parallel to the free end. The inverted, J-shaped hangers suspend the hanging tool support assembly over the support line. The downwardly extending end of each inverted, J-shaped hanger extends to a flared connecting portion that includes a top portion and a bottom portion. The top portion connects both of the downwardly extending ends of the inverted, J-shaped hangers. The bottom portion extends into a downwardly extending arm that also includes a flared portion. The movable support connects the downwardly extending arm to the tool support base. The tool support base has a top portion and a bottom portion, where the top portion attaches to the movable support and the bottom portion attaches to a tool support base plate that includes means to secure a tool. In regards to the positioning of the tool, the rotational joint attaches the downwardly extending arm to the movable support to rotate about a vertical axis relative to the downwardly extending arm. Furthermore in regards to the positioning of the tool, the pivoting joint attaches the movable support to the top portion of the tool support base and allows the tool support base to pivot about a horizontal axis relative to the movable support.

According to exemplary embodiments, a hanging tool support assembly includes a pair of inverted, parallel J-shaped hangers and a tool support base plate. The pair of inverted, J-shaped hangers includes a front hanger and a rear hanger. Each of the hangers has a free end and a downwardly extending arm substantially parallel to the free end. The downwardly extending arm of the front hanger includes a top portion extending downward to a vertically adjustable middle portion that includes a hollow threaded female cylinder, a complimentary threaded male shaft that allows for height adjustment and/or vertical positioning and a swivel joint. The downwardly extending arms of both the front and rear hangers link to the tool support base plate. Furthermore, the tool support base plate includes attachment means for securing a tool.

According to further exemplary embodiments, the hanging tool support assembly may include a sleeve, D-clips or other means for suspending the assembly from the support line, a carrying hook, and C-clips or alternate means for securing a tool. According to an embodiment, the sleeve is composed of a nonconductive material that extends about a portion of the hanger to provide improved frictional "gripping" with the support line. Additionally, the sleeve may be textured, such as a ribbed or notched surface, to further improve the frictional "gripping" of the support line. According to other embodiments, the carrying hook may be attached to a surface, such as a portion of the downwardly extending arm, and the carrying hook provides a means of transporting the hanging tool support assembly to the work site. According to still other embodiments, a pair of aligned C-shaped clips may be used to "clip" and/or "hold" a tool, such as a flashlight, into place. Alternative securement means, such as Velcro® strips, belt and buckle, and other securement means, may be used to secure the tool.

Further details on these embodiments and other possible embodiments including methods for using the hanging tool support assembly are set forth below. As is appreciated by those of ordinary skill in the art, this invention has wide utility in a number of areas as illustrated by the discussion below. These embodiments may be accomplished singularly, or in combination, in one or more of the implementations of this invention.

DESCRIPTION OF THE DRAWINGS

The above and other embodiments, objects, uses, advantages, and novel features of this invention are more clearly understood by reference to the following description taken in connection with the accompanying figures, wherein.

DETAILED DESCRIPTION

This invention now will be described more fully hereinafter with reference to the accompanying drawings, in which exemplary embodiments are shown. This invention may, however, be embodied in many different forms and should not be construed as limited to the embodiments set forth herein; rather these embodiments are provided so that this disclosure will be thorough and complete, and will fully convey the scope of invention to those of ordinary skill in the art. Like numbers refer to like elements throughout. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Thus, for example, it will be appreciated by those of ordinary skill in the art that the schematics and the like represent conceptual views of illustrative structures embodying this invention.

In the claims hereof any element expressed as a means for performing a specified function is intended to encompass any way of performing that function including, for example, a combination of elements that performs that function. The invention as defined by such claims resides in the fact that the functionalities provided by the various recited means are combined and brought together in the manner that the claims call for. Applicant thus regards any means that can provide those functionalities as equivalents as those shown herein.

The hanging tool support assembly of this invention provides a portable, adjustable support to hold and/or position a tool, such as a flashlight. The hanging tool support assembly hangs or is otherwise suspended from a support line proximate to a work area. As used herein, the term "support line" includes cables, conduits, pipes and/or any other appropriate lines that may be used to hang the hanging tool support assembly. For example, a suspended telecommunications cable may be used to hang the hanging tool support assembly. Still, other examples of a "support line" may include any other line that the hanging tool support assembly may hang from, such as a shower curtain rod, a top swing set pole, a small tree branch, and so on. According to embodiments of this invention, the hanging tool support assembly includes a pair of inverted, J-shaped hangers, a downwardly extending arm, a movable support piece connecting the downwardly extending arm to a tool support base, and attachment means for supporting and/or holding a tool to the tool support base. The hangers suspend and/or secure the assembly to the support line. In various embodiments of this invention, the hangers may further include additional safety and/or positioning components.

Figure 1:
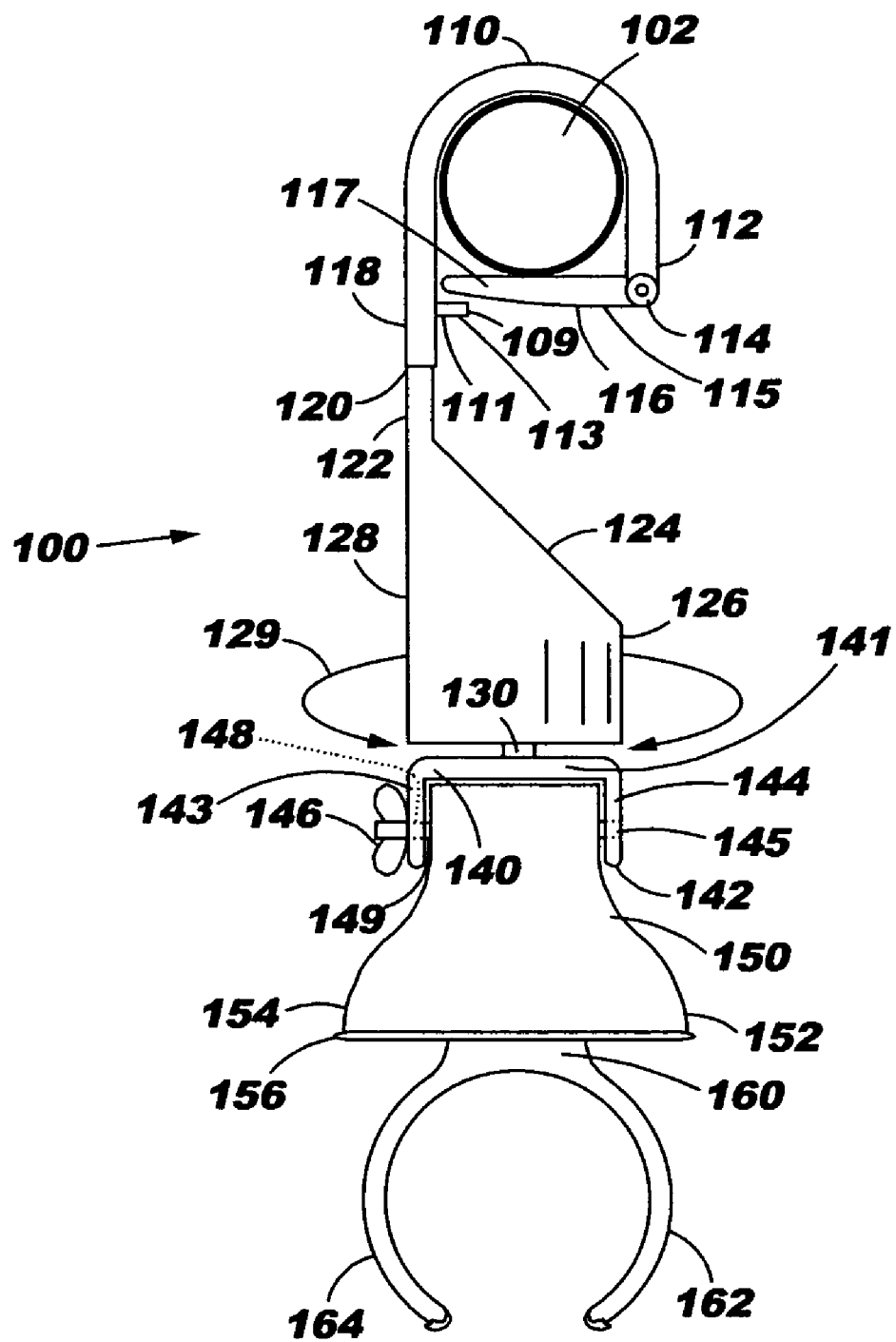
FIG. 1 is a perspective side view of a hanging tool support assembly according to embodiments of this invention.

Referring now to the figures, FIG. 1 is a perspective side view showing a hanging tool support assembly 100 suspended from a support line 102. The hanging tool support assembly 100 includes a pair of inverted, J-shaped hangers 110 having a free end 112, a downwardly extending end 118, a sleeve 120, a downwardly extending arm 128 having a flared portion 126, a movable support 140, a tool support base 150, and a tool attachment means 160. The hanging tool support assembly 100 may be composed of a variety of materials, such as metal, paper, cloth, polymer, plastic, ceramic, glass, and/or crystal.

The downwardly extending end 118 is substantially parallel to the free end 112 so that a portion of the support line 102 is encompassed by the inverted, J-shaped hangers 110. According to an embodiment, the hangers 110 have an attachment means 121, commonly known in the art as a "D-clip" (because it is shaped like the letter "D") to secure the hangers 110 around the support line 102. The attachment means 121 further includes a joint 114, a lever 116, and a lip 113. A first end 115 of the lever 116 attaches at the joint 114 to an inner portion of the free end 112. The lever 116 moves about an axis of the joint 114 so that the hanger 110 may encompass or wrap around the support line 102. The joint 114 may be a hinge, a pin, a spring, and/or a variety of other designs known by those of ordinary skill in the art to provide relative movement of the lever 116. The lip 113 includes a first end 111 that attaches to an inner portion of the downwardly extending end 118 and a second end 109 that projects out and mates with the lever's 116 second end 117 in an overlapping manner to better secure the hangers 110 about the support line 102. Preferably, the lip 113 is a flexible material, or is designed in such a way known by those of ordinary skill, so that when the lever 116 and the lip 113 mate, the lever 116 is capable of "snapping" or "clicking" above the lip 113, therefore locking or securing the attachment means 121 to the support line 102.

According to other embodiments, the sleeve 120 helps to secure and/or "grip" the hanging tool support assembly 100 to the support line 102. The sleeve 120 extends about a portion of the surface of the inverted, J-shaped hangers from the free end 112 to a portion of the downwardly extending end 118. The sleeve 120 may be composed of a variety of materials; however, a non-conductive material, such as paper, cloth, polymer, plastic, ceramic, glass, and/or crystal is preferred. Furthermore, the sleeve 120 may have a textured surface (not shown), such as ribs and/or notches, to better "grip" the support line 102. Alternately, if the sleeve 120 is absent; the inverted, J-shaped hangers 110 may have a textured surface to better "grip" the support line 102.

The downwardly extending end 118 extends and transitions to a downwardly extending arm 128 that includes a top portion 122, a center portion 124, and a bottom portion 126. As shown, the top portion 122 is narrower to the center portion 124 and the bottom portion 126. The center portion 124 widens or flares in a downward slope towards the bottom portion 126. The bottom portion 126 comprises an even wider, flared portion compared to the top and center portions 122, 124. The bottom portion 126 is flared to compliment in size and mate with the moveable support 140. Additionally, the flared center and bottom portion 124, 126 provide a stable foundation (e.g., center of gravity) for the hanging tool support assembly 100 to support and/or position a tool. A joint 130 connects the flared, bottom portion 126 of the downwardly extending arm 128 to an upper portion 141 of the movable support 140. The joint 130 comprises a swivel joint or another similar design, such as a ball and socket, such that the joint enables a rotational motion 129 of the movable support 140 relative to the downwardly extending arm 128.

The movable support 140 includes the upper portion 141, as described above, and a lower portion 142. The lower portion 142 includes a first lip 144 that is aligned with the free end 112 and a second lip 143 that is aligned with the downwardly extending end 118. The second lip 143 connects the tool support base 150 to the movable support 140. The first lip 144 has a second joint 145 that connects to an upper, first free side 152 aligned with the free end 112 of the tool support base 150 to allow the tool support base 150 to pivot up or down (the pivot motion is shown as reference numeral 412 in FIG. 4). The second lip 143 includes a passageway 148 for a screw 149 to pass through and connect with an upper, second, free side 154 (aligned with the downwardly extending end 118) of the tool support base 150. The screw 149 has a tightening bolt 146 that is manually and/or mechanically adjustable so the screw 149 frictionally engages with the upper, second free side 154 and can be tightened and/or loosened to adjust, position, and/or secure the tool support base 150. An example of the movement is similar to that of an adjustable fan that includes a tightening bolt and screw component to tilt a fan head in a desired direction and secure the fan head in that position. Alternatively, the assembly of the hanging tool support assembly can be designed to accommodate both right-handed and left-handed individuals.

The tool support base 150 widens or flares out (as shown in FIG. 1) downwards to mate with a tool support base plate 156. The tool support base plate 156 secures the tool attachment means referred to as "C" clamps 160 because of their resemblance to the letter "C". According to an embodiment, the "C" clamps 160 are complimentary shaped to support the body of a standard-sized utility flashlight. The design of the "C" clamps 160 includes a curved edge 162 and an opposed curved edge 164 similar to the two ends of the letter "C." The two edges 162, 164 have a thicker, slightly tightened, then flared design at an open end (not labeled) of each edge 162, 164 to securely engage the tool.

Figure 2:
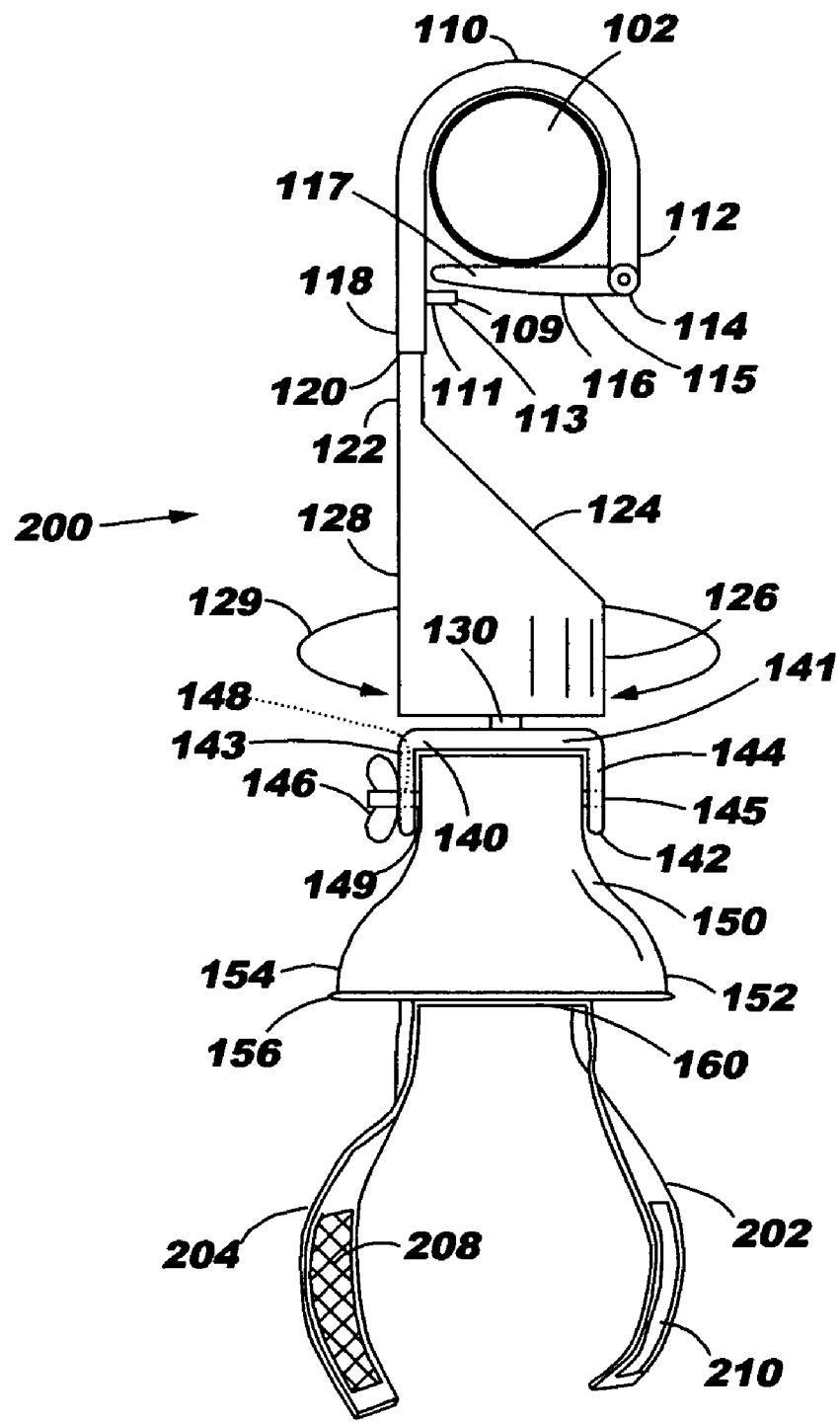
FIG. 2 is a perspective side view of another hanging tool support assembly according to embodiments of this invention.

FIG. 2 shows a perspective side view of a tool support assembly 200 similar to the tool support assembly 100 of FIG. 1; however, the tool support assembly 200 illustrates alternative means for securing a tool (shown as reference numeral 310 of FIG. 3) or alternate object (not shown) to the tool support base plate 156. The alternative means shown in FIG. 2 includes a first flexible strip 202 and a second opposed flexible strip 204. The strips 202, 204 mate together to secure the tool to the tool support base plate 156. For example, the strips 202, 204 may include a loop and fastener, a buckle and tongue, complimentary Velcro® straps attached to each strip 202, 204, as well as a variety of other means to allow the strips 202, 204 to be adjusted about the tool and mated to hold the tool to the tool support base plate 156.

Figure 3:
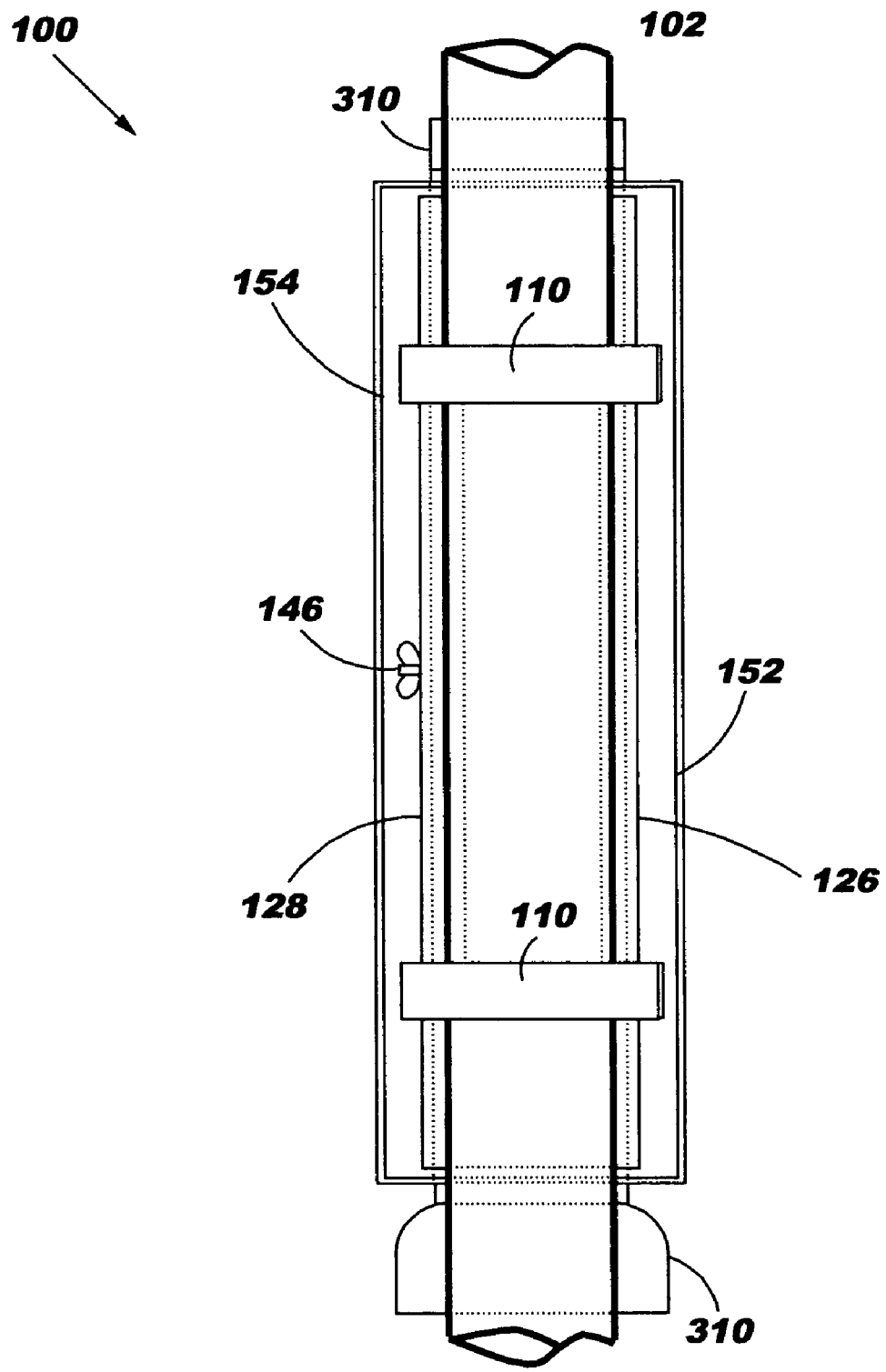
FIG. 3 is a perspective top view of the hanging tool support assembly of FIG. 1.

FIG. 3 shows a perspective top view of the hanging tool support assembly 100 of FIG. 1 suspended about support line 102 having a flashlight 310 secured to the tool support base 150. While not shown, the hanging tool support assembly 100 may alternatively hold a variety of other tools and/or objects, such as a screwdriver, meter, supplies, other hardware and equipment, and/or personal belongings (e.g., cellular phone, pager, etc.) of the individual using the hanging tool support assembly 100.

Figure 4:
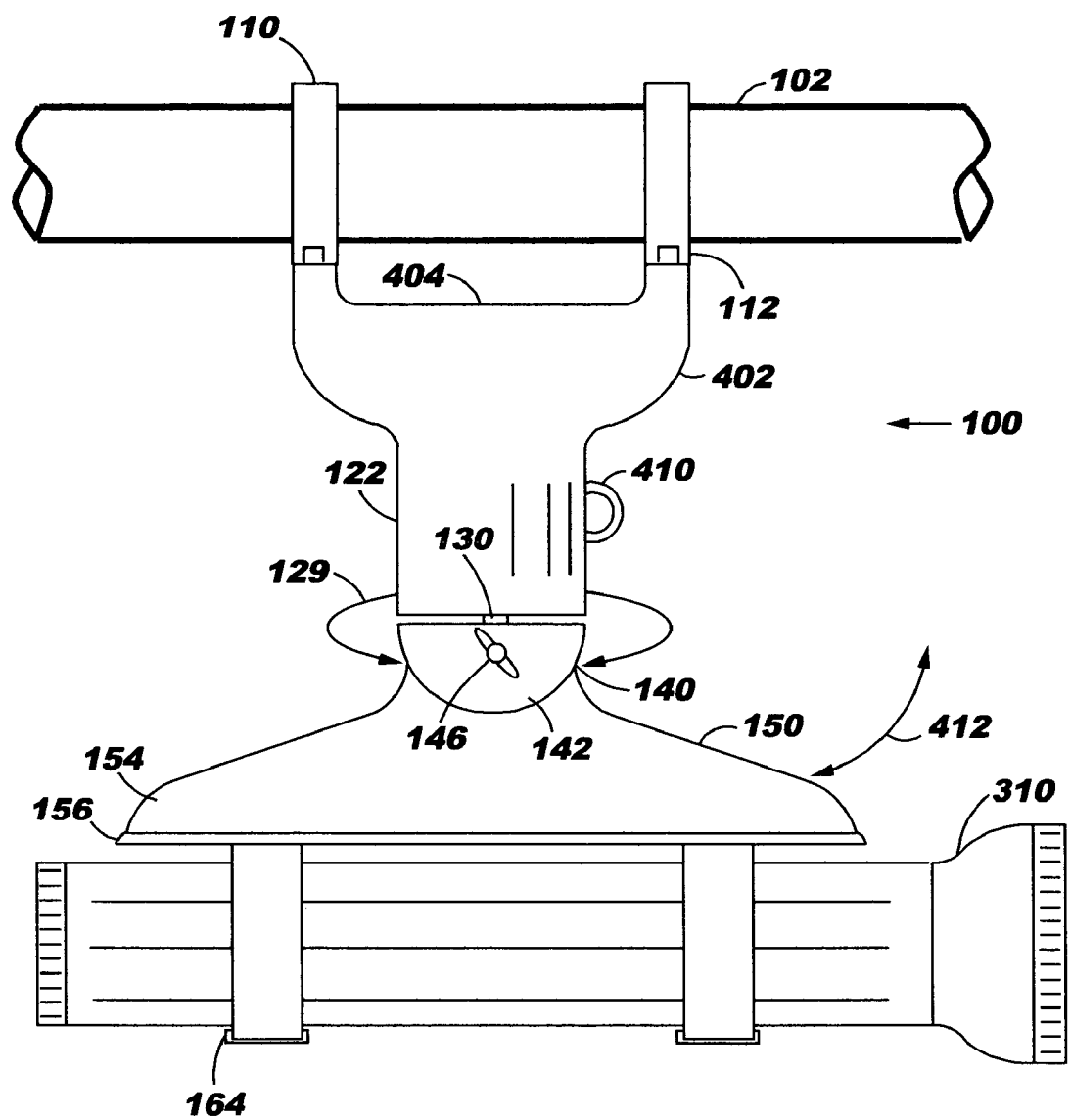
FIG. 4 is a perspective front view of the hanging tool support assembly of FIG. 1.

FIG. 4 illustrates a perspective front view of the hanging tool support assembly 100 of FIG. 1 showing the top flared portion 404 and bottom flared portion 402 of the downwardly extending end 118 that connect the pair of inverted, J-shaped hangers 110 and that extend down towards the downwardly extending arm 122. FIG. 4 further illustrates a hook 410 that may be useful for pulling up the hanging tool support assembly 100 to a desired work area. For example, the technician could loop a rope (not shown) through the hook 410 or engage the hook to his/her tool belt (not shown) to carry the hanging tool support assembly 100 to the desired work area. This allows the technician to use both hands to climb and/or reach the desired work area and/or to carry other equipment.

Furthermore, FIG. 4 illustrates the potential vertical movement 412 and other positioning possibilities 129 of the hanging tool support assembly 100. For example, when a flashlight 310 is secured to the hanging tool support assembly 100, the technician could loosen bolt 146 to vertically position 412 the flashlight 310 and tighten the bolt 146 to maintain a beam of light on a desired work area.

Figure 5:
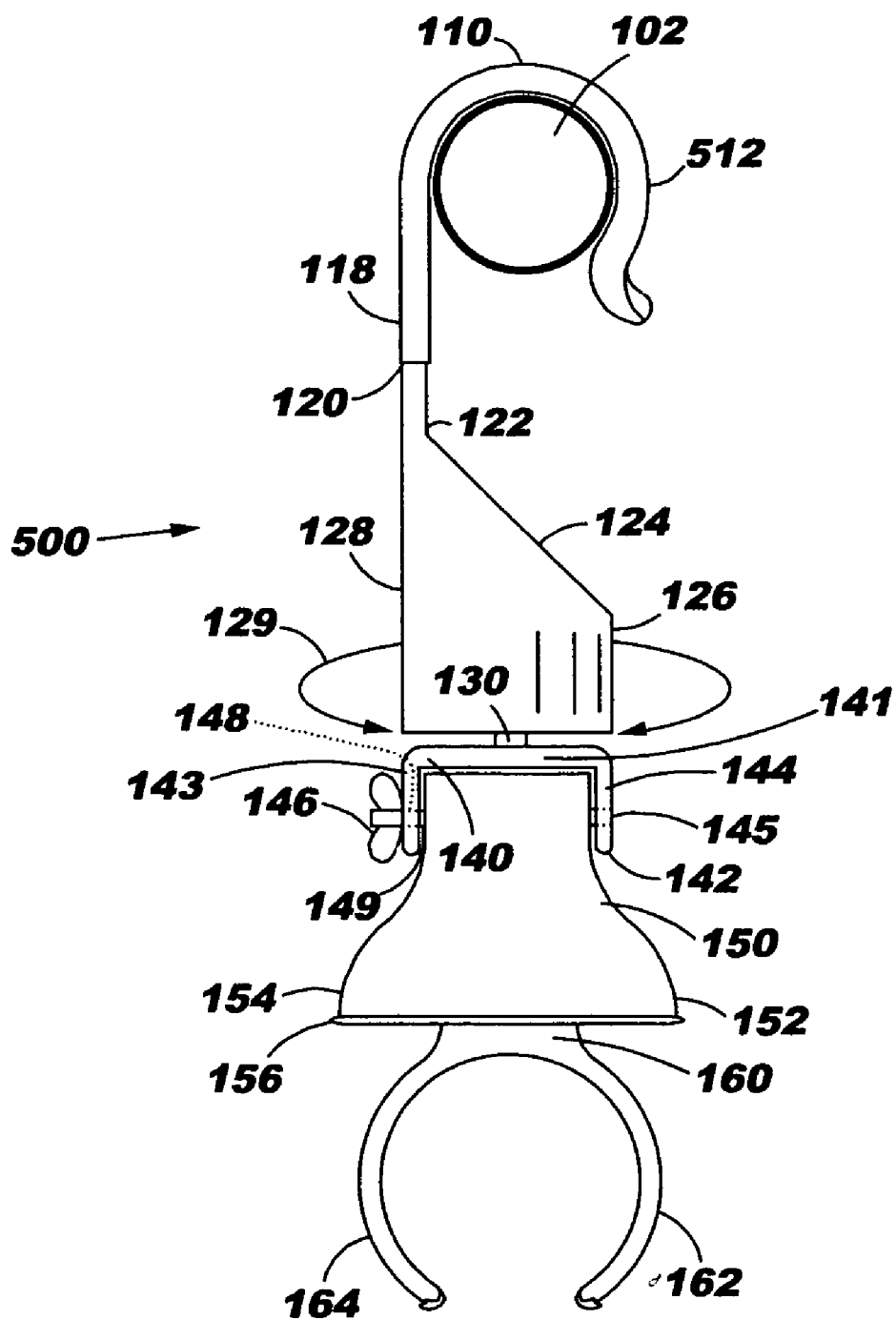
FIG. 5 is a perspective side view of still another hanging tool support assembly according to the embodiments of this invention.

FIG. 5 shows a perspective side view of a hanging tool support assembly 500 similar to the hanging tool support assembly 100 of FIG. 1. However, hanging tool support assembly 500 illustrates an alternate means 512 of suspending and/or securing the hanging tool support assembly 500. The alternate means 512 includes a curved, flared free end of the inverted, J-shaped hanger 110. This alternative design (i.e., the curved, flared free end) provides a simple "grasping" means of the support line 102. Still further, the material of the inverted, J-shaped hangers 110 including alternate means 512 may be a textured, flexible material that assists in "grasping" the support line 102.

Figure 6:
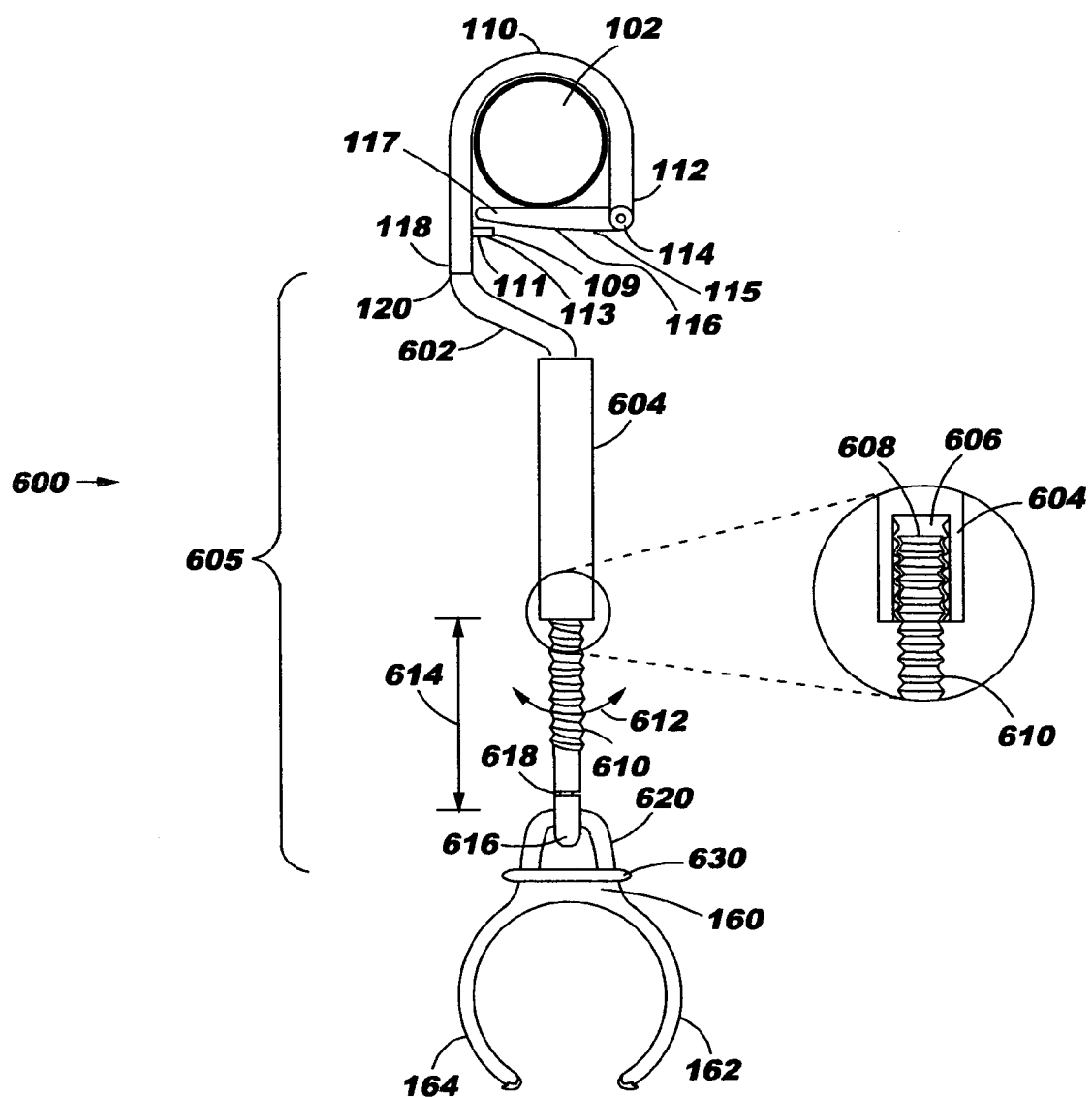
FIG. 6 is a perspective side view of an alternate hanging tool support assembly according to the embodiments of this invention.

FIG. 6 shows a perspective side view of another hanging tool support assembly 600. The hanging tool support assembly 600 includes a pair of inverted, J-shaped hangers 110 including a front hanger 601 and a rear hanger (shown in FIG. 7) that are both attached to a tool support base plate 630. The tool support base plate 630 has an attachment means 160 (similar to FIG. 1) for securing a tool, such as a flashlight.

As illustrated in FIG. 6, the front hanger 601 includes a downwardly extending arm 601 that includes a top portion 602, a vertically adjustable middle portion 604, and a bottom portion 610. The top portion 602 mates with the vertically adjustable middle portion 604. The vertically adjustable middle portion 604 includes a hollow, threaded female cylinder 606 and a complimentary, threaded male shaft having a top portion 608 and a bottom portion 610. The male shaft 608, 610 operates by rotational movement 612 to vertically adjust 614 a front portion of the tool support base plate 630. An example of using the vertical adjustment 614 is when the technician wants to tilt a flashlight (or other object) secured to the tool support base plate 630 to direct a beam of light to a desired work area. The technician, rotates (movement shown in reference numeral 612) the male shaft 608 upwards into the female cylinder 606 and stops rotating the shaft 608 when the desired position is reached. The bottom portion 610 attaches to a free floating rotational joint 618 that allows the male shaft 608, 610 to freely rotate (in a clockwise or counter clockwise rotational illustrated by reference numeral 612) so that the top of the shaft 608 can screw up or down in the cylinder 606. Further, the free floating rotational joint 618 attaches to a connecting bottom portion 616 that links 620 to the tool support base plate 630. The link 620 includes a pivoting joint that allows the tool support base plate 630 to pivot about a horizontal axis relative to a top portion of the tool support base plate 630.

Figure 7:
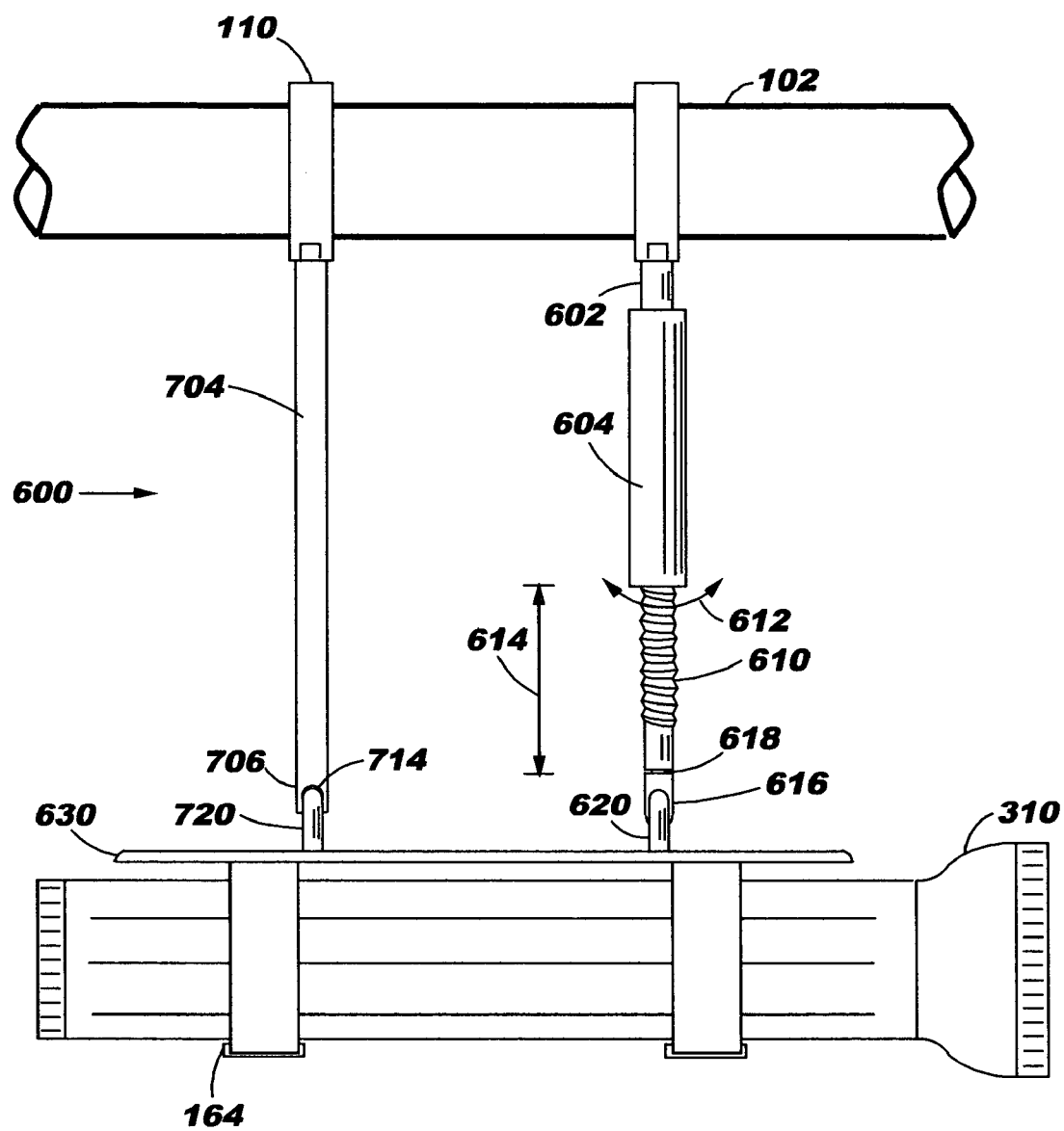
FIG. 7 is a perspective side view of the hanging tool support assembly of FIG. 6.

FIG. 7 shows a perspective front view of the hanging tool support assembly 600 of FIG. 6. FIG. 7 illustrates the rear hanger 110 having a downwardly extending arm 704. A bottom portion 706 of the downwardly extending arm 704 attaches to the tool support base plate 630 by link 720 similar to that of the front hanger 110. Furthermore, the linked attachment of the front and rear hangers 110 to the tool support base plate 630 allows the tool support base plate 630, including any secured tool (not shown), to "rock" that is, the linked attachment allows the tool support base plate flexible movement backwards and forwards and slightly upwards and/or downwards.

Figure 8:
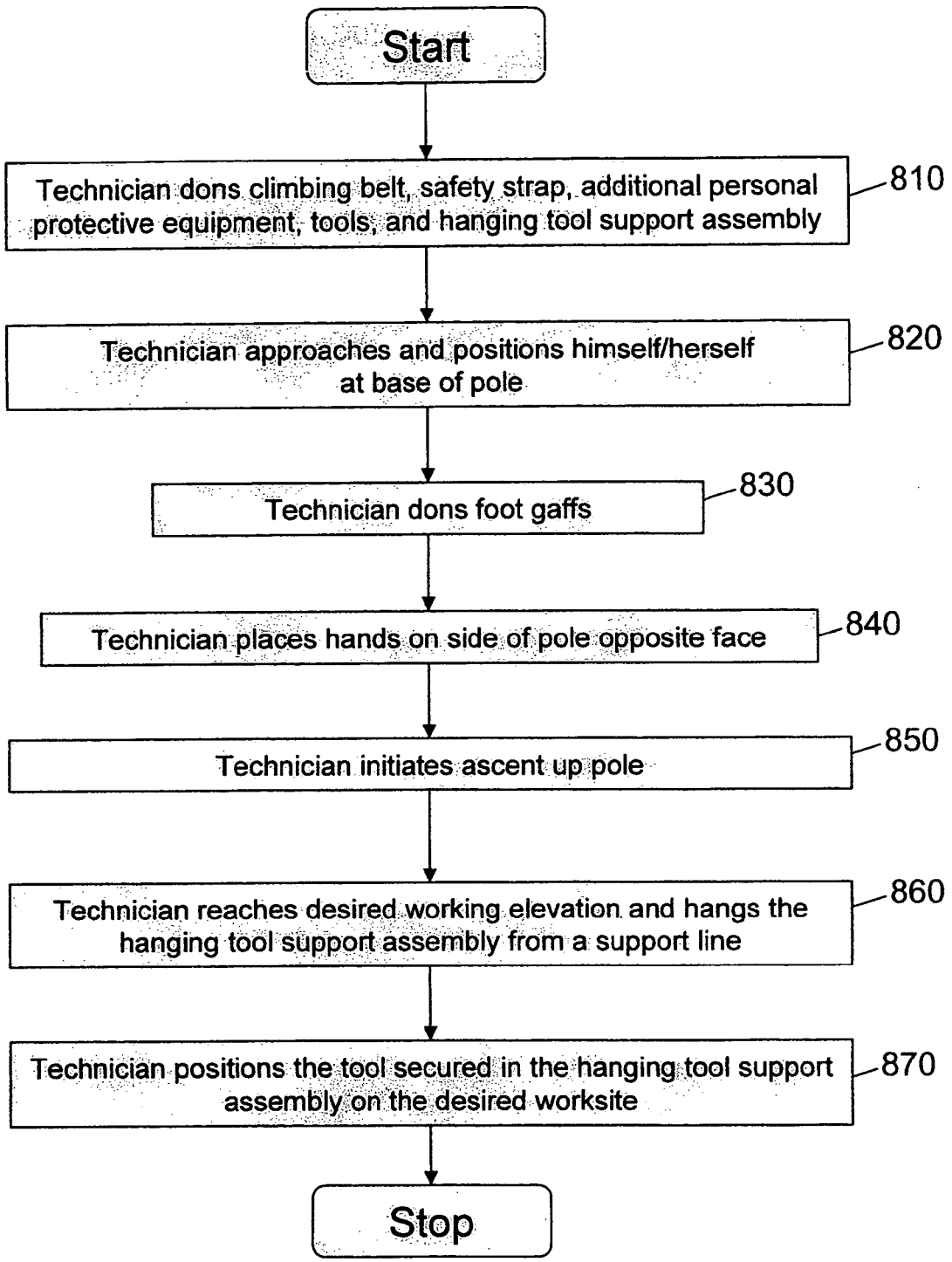
FIG. 8 is a method of using the hanging an exemplary hanging tool support assembly according to some of the embodiments of this invention.

In addition to the above embodiments, this invention includes a method of positioning a hanging tool support assembly and/or a method of suspending or otherwise hanging a hanging tool support assembly about a support line. As shown by the flowchart of FIG. 8, the method may include the technician donning a climbing belt and safety strap on the technician's waist as well as putting on additional safety equipment (e.g., hard hat), tools, and the hanging tool support assembly [block 810]. The technician places himself at the base of the pole [block 820] and dons the foot gaffs [block 830]. Thereafter, the technician places his/her hands on the side of the pole opposite his/her face [block 840] and initiates a hand-over-hand ascent up the pole [block 850]. Once the technician reaches a desired working elevation (e.g., the desired work position), then the technician hangs or suspends the hanging tool support assembly from the support line [block 860]. Thereafter, the technician uses a free hand to secure and position the tool secured in the hanging tool support assembly [block 870]. According to embodiments of this invention, the technician may secure the tool to the tool support assembly at any time, that is, he may secure the tool before or after climbing the pole. Moreover, the tool support assembly may be used to hold a variety of tools that are changed out as the work progresses. For example, the tool support assembly may be used to secure and position a flashlight during a first phase of a job, and then the tool support assembly may be used to secure and position a meter during a second phase of a job.

Many modifications and other embodiments of the invention will come to mind to one skilled in the art to which this invention pertains having the benefit of the teachings presented in the foregoing descriptions and the associated drawings. For example, the joints used to provide the positioning movements for the hanging tool support assembly 100, 600 may be of various types known to those in the art, such as swivel joints, ball and socket joint, and so on. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A hanging tool support assembly comprising:
    a pair of inverted, J-shaped hangers, each hanger having a free end and a downwardly extending end, each free end having an inner semi-circular surface about which the hanging tool support may be hung, the downwardly extending end substantially parallel to the free end and the downwardly extending end having a flared connecting portion, the flared connecting portion having a top portion and a bottom portion, wherein the top portion connects both of the downwardly extending ends of the inverted, J-shaped hangers, wherein the bottom portion comprises a downwardly extending arm, the downwardly extending arm having a flared portion, and wherein a portion of the inner semi-circular surface extending from the free end to the downwardly extending end comprises a textured surface;
    a movable support connecting the downwardly extending arm to a top portion of a tool support base;
    the tool support base having the top portion and a bottom portion, wherein the bottom portion comprises a tool support base plate having a means for securing a tool;
    a rotational joint attaching the downwardly extending arm to the movable support to rotate about a vertical axis relative to the downwardly extending arm; and
    a pivoting joint attaching the movable support to the top portion of the tool support base, the pivoting joint allowing the tool support base to pivot about a horizontal axis relative to the movable support.

2. The hanging tool support assembly of claim 1, wherein the downwardly extending arm further comprises a carrying hook, the carrying hook comprising a passageway having a generally cylindrical side portion, a substantially planar base portion, and inner diameter, wherein the substantially planar base portion attaches to a portion of a surface of the downwardly extending arm.

3. The hanging tool support assembly of claim 2, wherein the inner diameter is at least one centimeter.

4. The hanging tool support assembly of claim 1, the rotational joint comprising a ball and socket assembly.

5. The hanging tool support assembly of claim 1, the pivoting joint comprises a screw and nut assembly.

6. The hanging tool support assembly of claim 1, the means for securing the tool comprising at least two engagement members, each of the two engagement members having a first end attached to the tool support base plate and having a second end, the second end of each of the two engagement members mating together to secure the tool to the tool base.

7. The hanging tool support assembly of claim 1, wherein the tool comprises a flashlight.

8. The hanging tool support assembly of claim 1, the means for securing the tool comprising a pair of aligned C-shaped clips.

9. The hanging tool support assembly of claim 1, further comprising means for securing the free end of the inverted, j-shaped hanger about a support line.

10. The hanging tool support assembly of claim 9, wherein the attachment means comprises a lever and a lip, wherein a first end of the lever attaches to the inner semi-circular surface of the free end and of the lip attaches to an inner portion of the downwardly extending end and wherein a second end of the lever horizontally extends to and mates with an interior portion of a second end of the lip.

11. The hanging tool support assembly of claim 10, wherein the first end of the lever pivotally attaches to the inner semi-circular surface of the free end.

12. The hanging tool support assembly of claim 1, the hanging tool support assembly comprises at least one of the following materials:
    paper;
    cloth;
    metal;
    polymer;
    plastic;
    ceramic;
    glass; and
    crystal.

13. The hanging tool support assembly of claim 1, further comprising a sleeve extending about a portion of a surface of the inverted, J-shaped hanger.

14. The hanging tool support assembly of claim 13, wherein the sleeve comprises of a non-conductive material, the non-conductive material comprising at least one of:
    paper;
    cloth;
    polymer;
    plastic;
    ceramic;
    glass; and
    crystal.

15. The hanging tool support assembly of claim 14, wherein the non-conductive material of the sleeve comprises a textured outer surface.

16. A hanging tool support assembly, comprising:
    a pair of inverted, J-shaped hangers, each hanger having a free end and a downwardly extending end, each free end having an inner semi-circular surface about which the hanging tool support may be hung, the downwardly extending end substantially parallel to the free end and the downwardly extending end having a flared connecting portion, the flared connecting portion having a top portion and a bottom portion, wherein the top portion connects both of the downwardly extending ends of the inverted, J-shaped hangers, and wherein the bottom portion comprises a downwardly extending arm, the downwardly extending arm having a flared portion and a carrying hook, the carrying hook comprising a passageway having a generally cylindrical side portion, a substantially planar base portion, and an inner diameter, wherein the substantially planar base portion attaches to a portion of a surface of the downwardly extending arm;
    a movable support connecting the downwardly extending arm to a top portion of a tool support base;
    the tool support base having the top portion and a bottom portion, wherein the bottom portion comprises a tool support base plate having means for securing a tool;
    a rotational joint attaching the downwardly extending arm to the movable support to rotate about a vertical axis relative to the downwardly extending arm; and
    a pivoting joint attaching the movable support to the top portion of the tool support base, the pivoting joint allowing the tool support base to pivot about a horizontal axis relative to the movable support.

* * * * *